United States Patent Office 3,070,608
Patented Dec. 25, 1962

3,070,608
SELECTIVE ALCOHOLYSIS OF EPOXY FATTY ACID ESTERS
Frank E. Kuester, La Grange Park, Ill., and John L. Ohlson, Bedford, Mass., assignors to Swift & Company, Chicago, Ill., a corporation of Illinois
No Drawing. Filed July 7, 1958, Ser. No. 746,629
15 Claims. (Cl. 260—348)

This invention in general relates to alcoholysis of epoxy fatty acid esters. More specifically, the invention relates to alcoholysis of an epoxy fatty acid ester, e.g., animal or vegetable triglyceride oil, with an appropriate alcohol in the presence of an alkaline catalyst. The method of this invention, broadly, involves the transesterification of an epoxidized fatty acid ester, e.g., expoxidized animal or vegetable oil such as epoxidized soybean oil or epoxidized lard oil, with a monohydric, dihydric, or polyhydric alcohol in the presence of an alkaline catalyst such as potassium hydroxide, sodium methylate, sodium ethylate, metallic sodium, and sodium hydride. The esters formed by the instant process exhibit little or no decrease in total epoxide content over that of the original epoxy esters. Under the conditions of the instant invention, the expected reactivity of the epoxy group in the presence of an alkaline catalyst is kept at a minimum through control of time and temperature, the latter in particular. In general, reaction at temperatures above 125° C. results in some polymerization through the epoxy group. Because of this, it is necessary when preparing esters of high boiling alcohols to maintain the reaction temperature below the maximum in order that the oxirane content of the product be kept as high as possible. With alcohols boiling below 125° C., the temperature may be controlled by allowing the alcohol to boil and refluxing the same.

Broadly, the process of the instant invention is applicable to alcoholysis of monohydric alcohols with epoxy fatty acid esters of monohydric alcohols, polyhydric alcohols with epoxy fatty acid esters of monohydric alcohols, polyhydric alcohols with epoxy fatty acid esters of polyhydric alcohols and monohydric alcohols with epoxy fatty acid esters of polyhydric alcohols.

The alcohol used in the alcohlysis may be primary, secondary, or tertiary; monohydric or polyhydric. In general, the reaction becomes more sluggish as one proceeds from the primary to the secondary to the tertiary alcohols. The structure of the alcohol appears to offer no limitation on the process of the instant invention other than bearing on the time during which the alcoholysis takes place. Often, the alcohol is soluble in the epoxidized ester, but in instances where the reactants are not compatible with each other, a mutual solvent may be employed.

More specifically, the process of the instant invention involves the mixing of the epoxy ester with a molar excess, preferably five or more, of the alcohol, followed by heating the mixture to the operating temperature. It is preferred to conduct the reaction at about 90° C. and, in all instances, we recommend operation below 125° C. to minimize reaction of the epoxy group. An excess of alcohol is used not only to increase the rate of reaction, but also to drive the reaction more nearly to completion.

After the operating temperature has been reached, the alkaline catalyst is introduced into the mixture at a level between about 0.1 to 1.0%, usually about 0.5%. Sodium methylate is preferred because of the improved rate of reaction with this catalyst. Using sodium methylate, the reaction is usually completed in less than 5 hours. After the reaction period is over, the catalyst is neutralized and the free alcohols are removed either by washing or by a steam deodorization under vacuum. If deodorization is employed, the temperature should be kept below 125° C.

The alcohol reactant may be selected from any of the wide variety of aliphatic monohydric alcohols, dihydric alcohols, or polyhydric alcohols. Because of the reactivity of the oxirane group of the ester reactant under acidic conditions, aromatic alcohols such as phenol are not recommended. The unsubstituted aliphatic alcohols or the amine substituted aliphatic alcohols having an amine group with no reactive hydrogens on the amine nitrogen are preferred.

Monohydric aliphatic alcohols having from 1–20 carbon atoms are desirable alcohol reactants. Primary, secondary, and tertiary alcohols may advantageously be employed as the alcohol reactant. Tertiary alcohols react somewhat less rapidly than secondary alcohols while primary alcohols appear to be most reactive. Typical aliphatic monohydric alcohol reactants include methyl, ethyl, n-propyl, isopropyl, n-butyl, sec. butyl, tert-butyl, amyl, hexyl, heptyl, octyl, nonyl, decyl, undecyl, dodecyl, and other monohydric fatty alcohols. Suitable glycols include ethylene glycol, propylene glycol, butylene glycol, and other dihydric aliphatic alcohols. Any of the known polyhydric aliphatic alcohols, such as glycerol, erythritol, pentaerythritol, mannitol, and sorbitol may be used. Polyethylene glycol may also be employed as the alcohol reactant although with the higher alcohols it may be necessary, because these materials may be solids and not miscible with the ester reactant, to employ a mutual solvent in the reaction to insure intimate contact of the reactants.

Also considered within the scope of the definition of unsubstituted aliphatic alcohols are the partial esters of di and polyhydric alcohols. The mono and diglycerides, for example, are desirable alcohol reactants. These compositions are well known in the art and include such compositions as α-monostearin, α,α′-diolein, monoacetin, monobutyrin, monomyristin, monopalmitin monostearin, monopalmitin monoolein and mixtures such as commercial monoglycerides which contain mono, di and triglycerides.

The epoxy fatty acid esters are those prepared from aliphatic acids containing 10–22 carbons and also containing an oxirane group and aliphatic alcohols of the monohydric, dihydric, and polyhydric type. Epoxy fatty acid esters of monohydric alcohols include methyl epoxy stearate, ethyl epoxy stearate, isopropyl epoxy stearate, butyl epoxy stearate up to and including stearyl epoxy stearate, and monohydric alcohol esters of epoxy glyceride fatty acids such as methyl esters of epoxidized soybean oil fatty acids, butyl esters of epoxidized tallow fatty acids, and esters of epoxidized lard oil fatty acids, cottonseed oil fatty acids, menhaden oil fatty acids, etc. The epoxidized fatty acid esters of monohydric alcohols are prepared by the method of this invention as by reacting methanol with epoxidized linseed oil and, after separation of the glycerin from the epoxidized linseed oil methyl esters, further reacting the methyl esters with an appropriate alcohol.

Our invention may be understood more fully from the following examples:

EXAMPLE I

*Alcoholysis of Epoxidized Oils With a Monohydric Alcohol*

Two hundred grams of epoxidized oil and two hundred grams of methanol were heated to the reflux temperature of the mixture. The epoxidized oils were epoxidized soybean oil (5.95% oxirane oxygen), epoxidized lard oil (3.60% oxirane oxygen) and epoxidized menhaden oil (4.17% oxirane oxygen). In no case was a homogeneous solution obtained. Three grams of sodium methylate were added and after about five minutes the mixture became homogeneous. The reflux period was continued for two hours, after which the reaction mixture was poured into and mixed with a large volume of water. The organic layer which separated was then washed and dried to obtain the methyl esters of epoxy acids. Epoxy oxygen content of the methyl esters follows:

| | Percent oxirane |
|---|---|
| Methyl esters of epoxidized soybean oil | 5.65 |
| Methyl esters of epoxidized lard oil | 3.33 |
| Methyl esters of epoxidized menhaden oil | 3.85 |

EXAMPLE II

*Alcoholysis of Epoxidized Soybean Oil with 2-Ethylhexanol*

Two grams of potassium hydroxide were dissolved in two hundred grams of 2-ethylhexanol and then mixed with seventy grams of epoxidized soybean oil. The reaction mixture was held for three days at 60° C. The soaps were removed by filtration and the filtrate subjected to a vacuum steam distillation to remove the excess alcohol. After drying the product gave the following analysis:

| | |
|---|---|
| Saponification number | 141.7 |
| Percent epoxy oxygen | 3.41 |
| Acid number | 1.46 |

In this example 89.3% of the total epoxy oxygen is retained.

EXAMPLE III

*Alcoholysis of Epoxidized Soybean Oil With Triethanolamine*

One hundred grams of triethanolamine and two hundred grams of epoxidized soybean oil were heated to 90° C. At this temperature the mixture was not homogeneous. Five grams of sodium methylate were added and after stirring for ten minutes the mixture became homogeneous. The reaction mixture was heated for one hour and poured into an excess of water. The emulsion which formed was extracted with ether and the ether-soluble portion isolated. The ether-soluble portion of the reaction mixture contains only unreacted epoxidized soybean oil and the tri-(epoxystearyl) ester of triethanolamine. It is soluble in dilute hydrochloric acid and polymerizes with the addition of $BF_3 \cdot OEt_2$ indicating that the interesterification has taken place and that the oxirane group is still present.

EXAMPLE IV

*Alcoholysis of Epoxidized Soybean Oil With Glycerin*

Four hundred and fifty grams of epoxidized soybean oil and one hundred and five grams of glycerin were heated to 95° C. and treated with eleven grams of sodium methylate. The reaction mixture became clear shortly after the addition of the catalyst. After heating for one hour the mixture was placed in a separatory funnel and kept warm until the excess glycerin had separated from the reaction mixture. The product set up to a firm, solid polymer upon the addition of boron trifluoride.

EXAMPLE V

*Alcoholysis of Methyl Epoxy Stearate With Ethyl Cellosolve and Propylene Glycol*

The interesterification were carried on in the usual manner except that the product obtained using propylene glycol was taken up in ether and washed with water. Analyses of the compositions are listed below:

| | Methyl epoxy stearate | Ethyl Cellosolve ester | Propylene glycol ester |
|---|---|---|---|
| Saponification number | 185.7 | 172.3 | 181.5 |
| Percent epoxy oxygen | 3.84 | 3.64 | 3.74 |

EXAMPLE VI

*Oleyl Esters of Epoxidized Linseed Oil Fatty Acids*

One kilogram of epoxidized linseed oil having an iodine value of 9.0 and 8.89% epoxy oxygen was mixed with 1 liter of anhydrous methanol. The mixture was stirred and 10 grams of sodium methoxide were added. The mixture was then heated to about 65° C. and permitted to reflux. After about fifteen minutes the reaction mixture darkened and became homogeneous. Heating was continued for about one hour, and the reaction mixture was then cooled. The cooled mixture was washed with 2,000 ml. $H_2O$ to remove excess alcohol, glycerine, and catalyst. The oily product was washed with four additional 1,000 ml. water washes and then dried. The methyl esters of epoxidized linseed oil fatty acids had a saponification No.=172; acid No.=0.27 and 8.68% epoxy oxygen.

Three hundred grams of the dried methyl esters prepared above were mixed with two hundred and seventy grams oleyl alcohol. The mixture was agitated and three grams of sodium methoxide were added. The reactants were stirred and the stirred mixture was heated to 120° C. under a vacuum (water aspirator) for four hours. Methanol which was liberated was removed as the reaction proceeded. The reaction product was washed and dried in a similar manner to the methyl esters and the dried product had a saponification No.=97.9; acid No.=1.10 and 4.67% epoxy oxygen (theory=4.88%).

The epoxy esters may be used as plasticizers or stabilizers for polyvinyl halide films. The monohydric alcohol esters find particular use as plasticizers which provide good low temperature flexibility to the polymer film.

This application is a continuation in part of our copending application Serial No. 596,436, filed July 9, 1956, now abandoned.

Obviously, many modifications and variations of the invention as hereinbefore set forth may be made without departing from the spirit and scope thereof and therefore only such limitations should be imposed as are indicated in the appended claims.

We claim:

1. In a method for preparation of esters of oxirane containing fatty acids by alcoholysis, the steps which comprise: mixing oxirane containing higher fatty acid ester of an unsubstituted aliphatic alcohol selected from the group consisting of mono-; and di-; and polyhydric alcohol said alcohol having from 1–20 carbon atoms and containing no more than six hydroxyl groups, an excess of a material selected from the group consisting of unsubstituted aliphatic alcohols having from 1–20 carbon atoms and containing no more than six hydroxy groups, and tertiary amine substituted aliphatic alcohols wherein the substituents on the amine are hydroxy alkylene groups, and an alkaline interesterification catalyst at a temperature sufficient to maintain refluxing but not in excess of 125° C., and maintaining agitation of said mixture whereby alcoholysis of said mixture occurs.

2. The process of clam 1 wherein the catalyst is alkali metal lower alkoxide.

3. The process of claim 1 wherein the oxirane containing higher fatty acid ester is oxirane containing triglyceride.

4. The process of claim 3 wherein the alcohol reactant is the monohydric alcohol.

5. The process of claim 3 wherein the alcohol reactant is the polyhydric alcohol.

6. The process of claim 1 wherein the alcohol reactant is the monohydric alcohol.

7. The process of claim 1 wherein the alcohol reactant is the polyhydric alcohol.

8. In the method for alcoholysis of epoxidized triglycerides with a material selected from the group consisting of unsubstituted aliphatic alcohols having 1–20 carbon atoms and not more than six hydroxyl groups, and tertiary amine substituted aliphatic alcohols wherein the substituents on the amine are hydroxy alkylene groups, the improvement which comprises: reacting an oxirane containing triglyceride fat and a molar excess of said alcohol at a temperature sufficient to cause refluxing but not in excess of 125° C. in the presence of an alkaline interesterification catalyst.

9. The method of claim 8 wherein the alcohol is polyhydric.

10. The method of claim 8 wherein the alcohol is monohydric.

11. The method of claim 8 wherein the triglyceride is vegetable oil.

12. In a method for alcoholysis of epoxidized triglycerides with an unsubstituted monohydric aliphatic alcohol having from 1–20 carbon atoms, the improvement which comprises: reacting an oxirane containing triglyceride and more than a five molar excess of said alcohol at a temperature sufficient to cause refluxing but not in excess of 125° C. in the presence of an alkaline interesterification catalyst.

13. The method of claim 12 wherein the triglyceride is a vegetable oil.

14. In a method for alcoholysis of epoxidized higher fatty acid esters with a material selected from the group consisting of unsubstituted aliphatic alcohols containing from 1–20 carbon atoms and up to six hydroxyl groups and tertiary amine substituted aliphatic alcohols wherein the substituents are hydroxy alkylene groups, the improvement which comprises: refluxing a mixture of oxirane containing higher fatty acid ester and a molar excess of said aliphatic alcohol at a temperature sufficient to cause refluxing but not in excess of 125° C. in the presence of an alkaline interesterification catalyst.

15. In a method for alcoholysis of epoxidized triglycerides with a material selected from the group consisting of unsubstituted aliphatic alcohols containing 1–20 carbon atoms and up to six hydroxyl groups, and amine substituted aliphatic alcohols wherein the substituents are hydroxy alkylene groups, the improvement which comprises: refluxing oxirane containing triglyceride and a molar excess of aliphatic alcohol at a temperature sufficient to cause refluxing but not in excess of 125° C. in the presence of an alkaline interesterification catalyst.

References Cited in the file of this patent

UNITED STATES PATENTS

| | | |
|---|---|---|
| 2,524,432 | Dorough | Oct. 3, 1950 |
| 2,698,308 | Crecelius | Dec. 28, 1954 |
| 2,889,339 | Levy et al. | June 2, 1959 |

OTHER REFERENCES

Royals: Advanced Organic Chemistry, 1954, page 606.